(12) United States Patent
Pinkerton et al.

(10) Patent No.: US 9,229,739 B2
(45) Date of Patent: *Jan. 5, 2016

(54) CREATION AND MANAGEMENT OF ELECTRONIC FILES FOR A LOCALIZATION PROJECT

(71) Applicant: Microsoft Technology Licensing, LLC, Redmond, WA (US)

(72) Inventors: James M. Pinkerton, Bellevue, WA (US); Terry Farrell, Dublin (IE); Peter A. Thompson, Redmond, WA (US); Jan Anders Nelson, Gig Harbor, WA (US); David Ahs, Dublin (IE); Jordi Mola Marti, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 26 days.

This patent is subject to a terminal disclaimer.

(21) Appl. No.: 13/632,729

(22) Filed: Oct. 1, 2012

(65) Prior Publication Data

US 2013/0031530 A1   Jan. 31, 2013

Related U.S. Application Data

(63) Continuation of application No. 11/981,090, filed on Oct. 31, 2007, now Pat. No. 8,307,008.

(51) Int. Cl.
*G06F 17/30* (2006.01)
*G06F 9/44* (2006.01)

(52) U.S. Cl.
CPC .................................. *G06F 9/4448* (2013.01)

(58) Field of Classification Search
None
See application file for complete search history.

(56) References Cited

U.S. PATENT DOCUMENTS

| 6,119,079 | A  | 9/2000  | Wang et al. |
| 6,311,151 | B1 | 10/2001 | Yamamoto et al. |
| 7,024,365 | B1 | 4/2006  | Koff et al. |
| 2004/0181544 | A1 | 9/2004 | Anderson |
| 2005/0066316 | A1 | 3/2005 | Nguyen et al. |
| 2005/0108433 | A1 | 5/2005 | Wu et al. |
| 2005/0273707 | A1 | 12/2005 | Chu et al. |
| 2006/0047689 | A1 | 3/2006 | Gabbert et al. |
| 2006/0156278 | A1 | 7/2006 | Reager |
| 2006/0195831 | A1 | 8/2006 | Bossom et al. |
| 2007/0061345 | A1 | 3/2007 | Thompson et al. |
| 2007/0061350 | A1 | 3/2007 | Thompson et al. |
| 2007/0061428 | A1 | 3/2007 | Haley et al. |

(Continued)

OTHER PUBLICATIONS

"About Visualize Localize", Visual Localize: Translate your software easily. http://www.visloc.com/allgemeine_infos.html?&L=2 Dated: Sep. 18, 2007 pp. 1-2.

(Continued)

*Primary Examiner* — Bai D. Vu
(74) *Attorney, Agent, or Firm* — Timothy Churna; Kate Drakos; Micky Minhas

(57) ABSTRACT

Electronic files for a localization project may be created and/or managed. The electronic files may be based on a data structure that defines the format and content of the electronic files and may include a first data structure portion that may contain data representing a plurality of references to localization project files. The data structure may includes a second data structure portion that may be associated with the first data structure portion that may contain data that may represent a plurality of references to standard files.

20 Claims, 10 Drawing Sheets

(56) References Cited

U.S. PATENT DOCUMENTS

2007/0233456 A1    10/2007    Kim
2009/0112893 A1    4/2009    Pinkerton

OTHER PUBLICATIONS

"Multilizer 2007 Enterprise", http://www.multilizer.com/products/Multilizer2007_ent.html Dated: 2007 p. 1.

"RC-WinTrans X8 Editions", 2005. http://www.wernerschaudin.de/25.0.html Originally reprinted from the internet: Sep. 18, 2007. pp. 1-2.

Sasaki, Felix. "Proceedings of Extreme Markup Languages". Montreal, Quebec http://conferences.idealliance.org/extreme/html/2007/Sasaki01/EML2007Sasaki01.html. Dated: Aug. 7-10 pp. 1-18.

Frimannsson, Asgier., "Adopting Standards Based XML File Formats in Open Source Localisation." http://www.localisation.ie/resources/Awards/Theses/Thesis_Asgeir_Frimannsson.pdf Dated: Jun. 17, 2005 pp. 1-79.

McGrath, Tim., "Universal Business Language", http://www.itsc.org.sg/synthesis/2004/4_UBL.pdf Originally reprinted from the internet: Sep. 18, 2007. pp. 1-9.

Non-Final Office Action cited in related U.S. Appl. No. 11/981,090 Dated: Feb. 2, 2010 pp. 1-23.

Amendment cited in related U.S. Appl. No. 11/981,090 Dated: May 3, 2010 pp. 1-15.

Final Office Action cited in related U.S. Appl. No. 11/981,090 Dated: Jul. 13, 2010 pp. 1-16.

Amendment cited in related U.S. Appl. No. 11/981,090 Dated: Oct. 13, 2010 pp. 1-20.

Non-Final Office Action cited in related U.S. Appl. No. 11/981,090 Dated: Dec. 27, 2010 pp. 1-14.

Amendment cited in related U.S. Appl. No. 11/981,090 Dated: Mar. 28, 2011 pp. 1-18.

Office Action cited in related U.S. Appl. No. 11/981,090 Dated Jul. 7, 2011 pp. 1-7.

Amendment cited in related U.S. Appl. No. 11/981,090 Dated: Aug. 8, 2011 pp. 1-14.

Final Office Action cited in related U.S. Appl. No. 11/981,090 Dated: Oct. 13, 2011 pp. 1-19.

Amendment cited in related U.S. Appl. No. 11/981,090 Dated: Jan. 31, 2012 pp. 1-17.

Notice of Allowance cited in related U.S. Appl. No. 11/981090 Dated: Jun. 26, 2012 pp. 1-24.

Amendment cited in related U.S. Appl. No. 11/981,090 Dated: Sep. 26, 2012 pp. 1-12.

Amendment cited in related U.S. Appl. No. 11/981,090 Dated: Oct. 3, 2012 pp. 1-7.

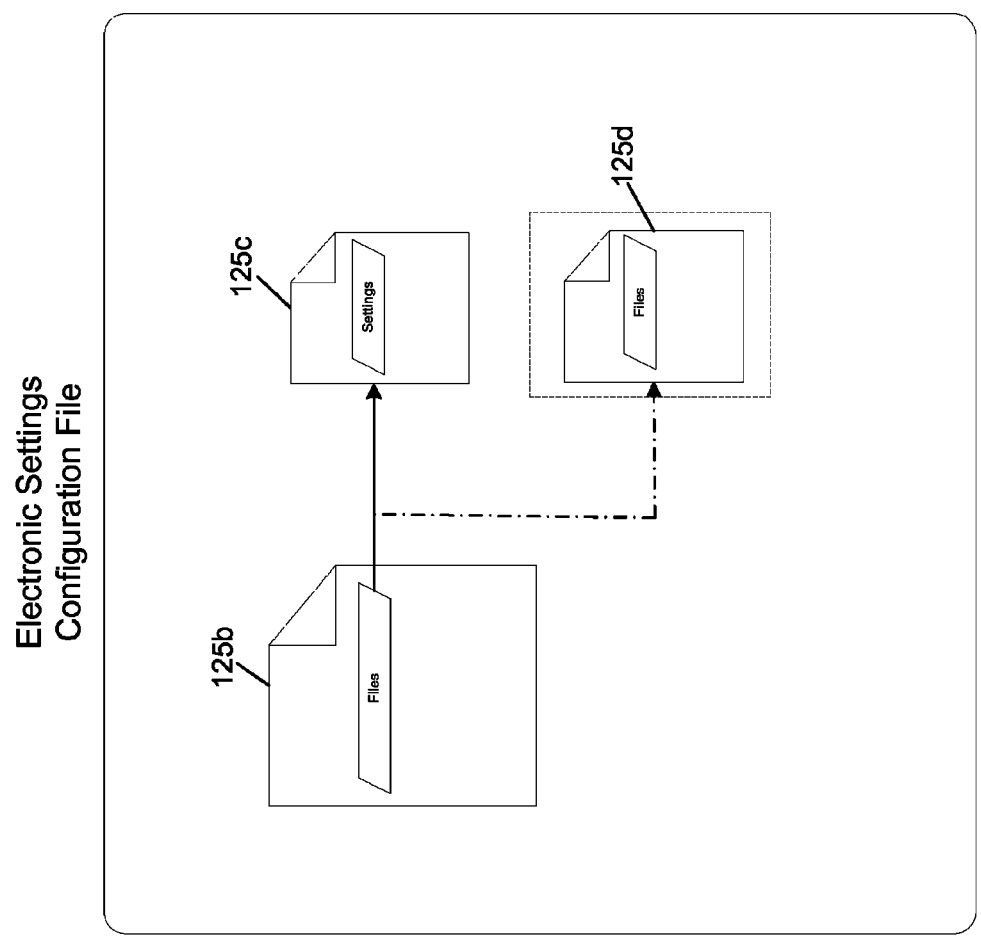

CREATION AND MANAGEMENT OF ELECTRONIC FILES FOR A LOCALIZATION PROJECT

RELATED APPLICATION

This application is a continuation of U.S. patent application Ser. No. 11/981,090, filed on Oct. 31, 2007, entitled "CREATION AND MANAGEMENT OF ELECTRONIC FILES FOR A LOCALIZATION PROJECT," at least some of which may be incorporated herein.

BACKGROUND

Localization is the process by which computer software is adapted for non-native environments. More specifically, localization is the process by which computer software is adapted to be as familiar as possible to denizens of a specific, non-native locale, by displaying text in the local language and using local conventions for the display of such objects as units of measurement.

Conventional localization processes make use of a set of technologies that are used to translate software developer/manufacturer products for non-native environments. Such technologies typically include a database file that contains the project definition and localization data. Conventional database files can be based on archaic and unsupported database software. Other limitations of conventional database files include no direct access to project data, poor scalability and limited extensibility. Many conventional localization processes rely on a binary data format for data storage called espresso database (EDB).

Using conventional localization processes, there is no easy way to perform comparisons of product versions in order to determine changes between product versions (what has been fixed, what has been translated) because of the aforementioned binary database storage format. Moreover, if an error or "bug" has been introduced into a file, there is no good way to determine what has changed in the file using the binary database storage format.

Additionally, newer versions of the database software that may be run on machines in the localization network that are different from the one which created the EDB, result in an upgrade of the EDB to a newer version. Older versions of the database software cannot open the newly upgraded EDB. Accordingly, the use of conventional localization processes can prove problematic and inadequate to meet software localization needs.

SUMMARY

This Summary is provided to introduce a selection of concepts in a simplified form that are further described below in the Detailed Description. This Summary is not intended to be used to limit the scope of the claimed subject matter.

The creation and management of extensible and communicable electronic files for a software localization project is disclosed. The electronic files are based on a data structure that defines the format and content of the electronic files that includes a data structure portion that contains data that represents references to localization files. Moreover, the data structure includes a data structure portion that contains data that represents references to standard files. The information in the localization and standard files is used to complete the software localization project.

DESCRIPTION OF THE DRAWINGS

The accompanying drawings illustrate embodiments and, together with the description, serve to explain at least some of the principles of the embodiments:

FIG. 1D illustrates the structure of an electronic settings configuration file according to an embodiment.

The drawings referred to in this description should not be understood as (e.g., necessarily) being drawn to scale except if specifically noted.

DETAILED DESCRIPTION

Reference will now be made in detail to various embodiments of the claimed subject matter, examples of which are illustrated in the accompanying drawings. While the claimed subject matter will be described in conjunction with these embodiments, it will be understood that they are not intended to limit the claimed subject matter to these embodiments. On the contrary, the claimed subject matter is intended to cover alternatives, modifications and equivalents, which may be included within the spirit and scope of the claimed subject matter as defined by the appended claims. Furthermore, in the following description, numerous specific details are set forth in order to provide a thorough understanding of embodiments. In other instances, well-known methods, procedures, components, and circuits have not been described in detail as not to unnecessarily obscure aspects of embodiments.

As used herein, the term "localization file" is intended to refer to an electronic file which contains data directly required for the localization of software. Localization files include but are not limited to Package, Project, Localization Content Exchange (LCX), Settings Configuration, and Settings files. In addition, as used herein, the term "standard file" is intended to refer to an electronic file which contains associated data used during the localization of software. Examples of standard files include but are not limited to text files, XML, executables, and dynamic link libraries.

Figure 1A:
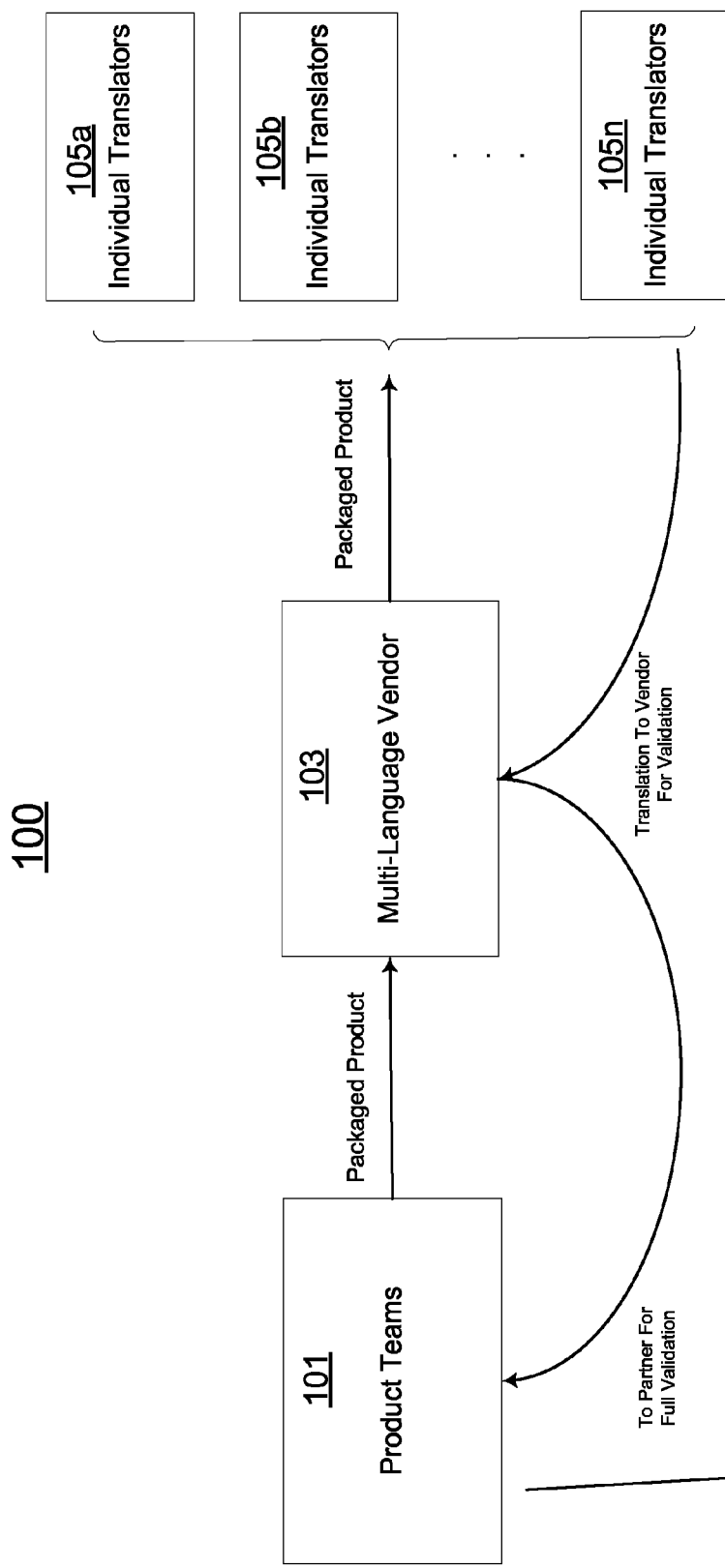
FIG. 1A illustrates an exemplary network setting for a system for creating and managing electronic files for a localization project according to an embodiment.
Figure 1A:
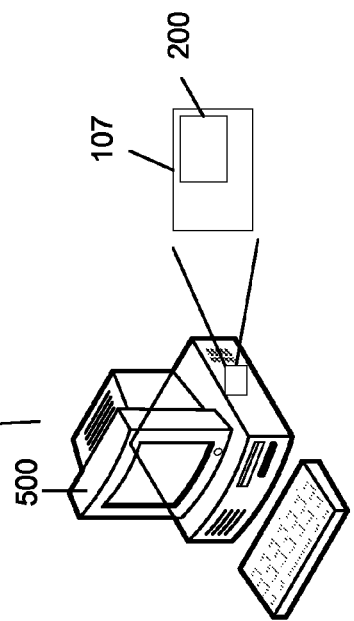

Exemplary Network Setting of System for Creation and Management of Electronic Files for a Localization Project FIG. 1A shows an exemplary network setting 100 for a system 200 for creating and managing electronic files for a localization project according to one embodiment. Exemplary network setting 100 includes product teams 101, multi-language vendors 103, individual translators 105a-105n, localization system 107, system 200 and computer system 500.

Referring to FIG. 1A, product teams 101 include divisions of a software developers localization team. These divisions can include but are not limited to software build teams and software localization teams. More specifically, product teams 101 include the teams that are involved in the production of a packaged product that includes a packaged electronic file that includes the software to be localized and files that contain the data involved in completing the localization project. In one embodiment, the packaged electronic file can be created and managed using system 200.

In one embodiment, the content of the packaged electronic files that are created using system 200 is human readable, and text based so that a diff (e.g., a file comparison that outputs the difference between two compared files) can be performed so as to easily identify any changes in software and translations. In one embodiment, the packaged electronic files can be packaged into a single file to facilitate efficient hand-off and hand-back of data between product teams 101, multi-language vendors 103 and individual translators 105a-105n. The format and content of different electronic files types that are created and managed using system 200 are discussed below in detail with reference to FIGS. 1B-1D.

Multi-language vendors 103 contract with product teams 101 to obtain software that is the subject of a localization project. In one embodiment, multi-language vendors 103 determine the proper translator that a packaged electronic file should be provided to for the localization project and contract with that translator to complete the translation of the software. In one embodiment, when a translator has completed the translation of the software, multi-language vendors 103 can obtain the translation of the software from individual translators 105a-105n and perform a validation of the translation.

As discussed above, individual translators 105a-105n contract with multi-language vendors 103 to provide translation of the software. Once individual translators 105a-105n have completed their translation of the software, the software translations (via a packaged electronic file) can be handed back to multi-language vendors 103 for validation.

Localization system 107 is an application that facilitates the translation of the software from one language to another. In one embodiment, localization system 107 can be an application that runs on a computer system such as computer system 500 that is employed by product teams 101, multi-language vendors 103 and individual translators 105 (a detailed discussion of computer system 500 is provided with reference to FIG. 5). In one embodiment, a user interface that is associated with localization system 107 can be provided to assist users in the navigation of localization system 107. In one embodiment, localization system 107 can extract resources from a source product (e.g., software), translate the resources from a source language into a target language and build a localized target version of the software product.

System 200 operates in conjunction with localization system 107 and facilitates the creation and managing of electronic files for a localization project. In one embodiment, system 200 provides enhanced programmatic access to the electronic files including contained business logic and resource data. For example, in one embodiment, system 200 can create new project, package and settings configuration files. In addition, in one embodiment, system 200 can perform file management such as adding, removing and renaming files. In one embodiment, system 200 can enter project properties such as well known folders, settings files and custom column definitions. In one embodiment, system 200 can convert between a project and a package file.

Additionally, system 200 provides application building functionality for parsing and generating application builds, running extensions and running commands such as update, upload, import and sync.

In one embodiment, the above mentioned programmatic access to localization data that is provided by system 200, provides product teams 101, multi-language vendors 103 and individual translators 105a-105n with the capacity to access project level resources, file level resources and individual resources for the purpose of making programmatic modifications thereto. It should be appreciated that the capacity to access such resources and make programmatic modifications to them enables an effective translation process.

For example, in one embodiment, if a particular software version is provided to an individual translator 105a-105n for translation and during the translation an updated version of the particular software version is released, the individual translator 105a-105n can obtain the new version of the software and update the translation to include the additions and modifications in the new version of the software. More specifically, if word processing software that includes a set number of strings is provided for translation and during the translation of the word processing program an updated version of the program that includes, for example, new dialog for "page setup" that adds 50 more strings is released, the individual translator 105a-105n can obtain the new version and using the functionality of system 200 can run custom processes (e.g., synchronization) provided by product teams 101 to receive new data while preserving their existing translations.

Electronic Localization Files

As discussed above, electronic files that contain data involved in completing a localization project can be created and managed using system 200. In one embodiment, a plurality of types of files can be created and managed using system 200 including an electronic localization project file 120, an electronic localization package file 140 and an electronic configuration file 125.

Figure 1B:
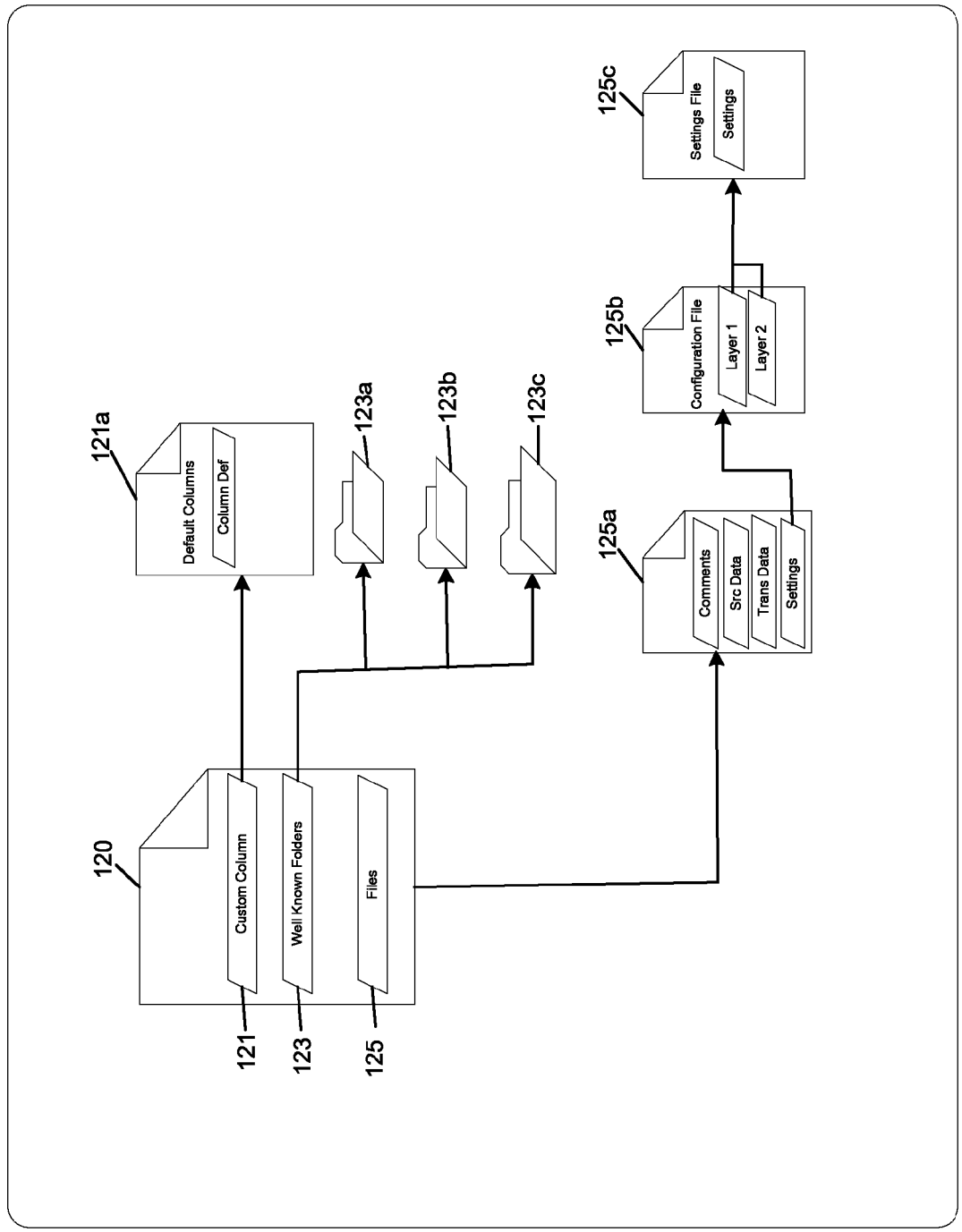
FIG. 1B illustrates the structure of an electronic localization project file according to an embodiment.

FIG. 1B shows the structure of an electronic localization project file 120 according to one embodiment. In one embodiment, electronic localization project file 120 defines the project data to be used in the localization process. In one embodiment, electronic localization project file 120 is structured according to an extensible schema that defines the format and content of electronic localization project file 120. In one embodiment, the extensible schema provides that electronic localization project file 120 include a collection of references to both localization and standard files.

In the FIG. 1B embodiment, electronic localization project file 120 includes custom column file 121, well known folders 123 and localization files 125. In the FIG. 1B embodiment, custom column file 121 includes default columns definition file 121a, well known folders 123 include source files 123a, source localization files 123b and target files 123c and files 125 include localization file 125a which includes settings configuration file 125b and settings files 125c.

In one embodiment, the folders and files of electronic localization project file 120 enumerated above encompasses a collection of references to localization data files, project properties and any additional file types (e.g., xml, txt, etc.) used during the localization process. In one embodiment, electronic localization project file 120 provides a mechanism for manipulating a set of files that have been grouped together for a localization project. In one embodiment, a project can be specific to a single source and target language pair. In other embodiments, projects may not be specific to a single source and target language pair.

In one embodiment, localization files 125a may not maintain a reference back to a project. This enables individual localization data file (e.g., 125a) to be contained within other projects. In one embodiment, electronic localization project file 120 can maintain references to individual files and embedded localization project files may not be supported. In another embodiment, embedded localization project files may be supported. In one embodiment, electronic localization project file 120 and referenced files can be "packed" into single file format to be transported to individuals involved in a localization effort (e.g., FIG. 1C).

Figure 1C:
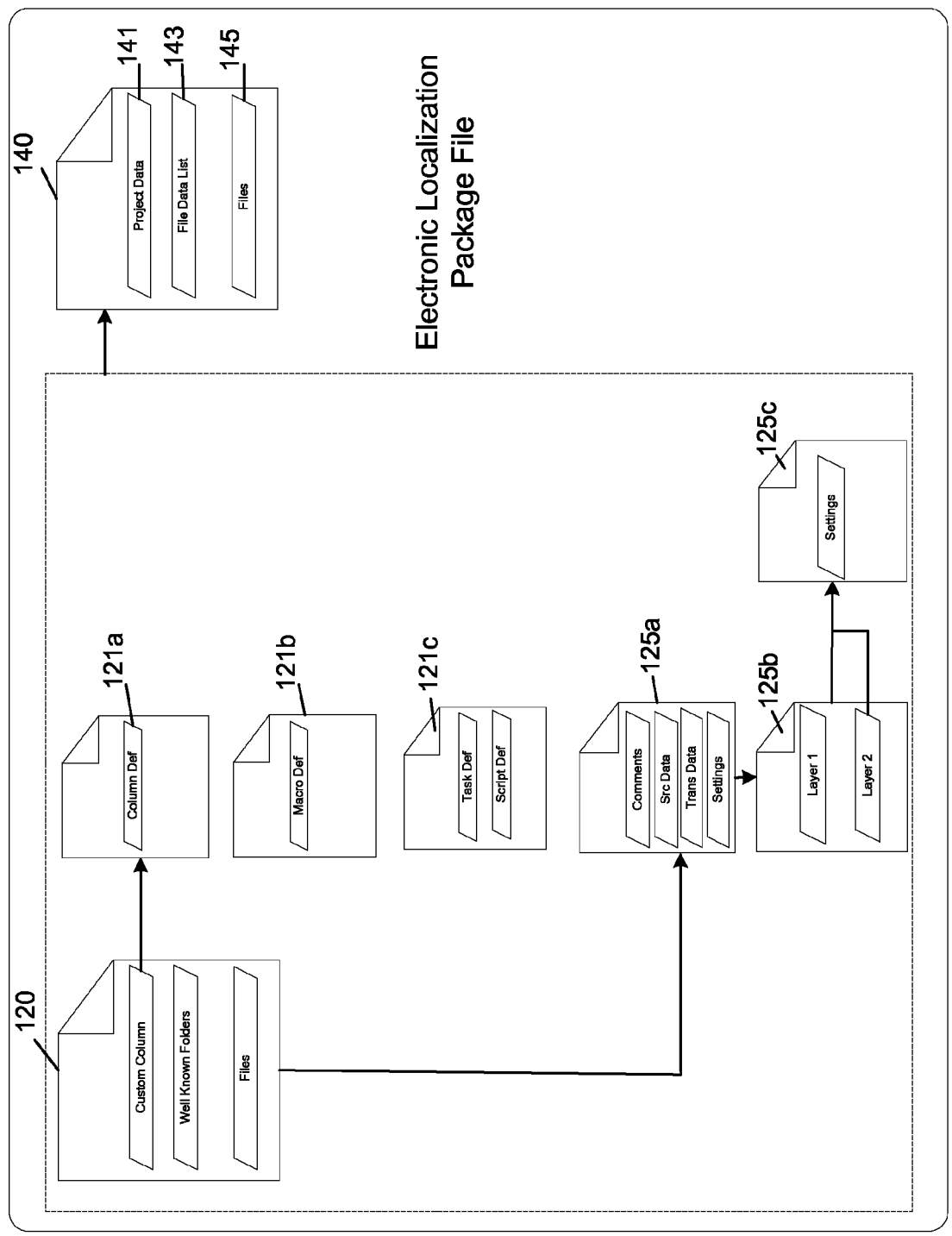
FIG. 1C illustrates the structure of an electronic localization package file according to an embodiment.

FIG. 1C shows the structure of an electronic localization package file 140 according to one embodiment. In one embodiment, electronic localization package file 140 combines the data involved in completing a project into a single file that enables the transport of localization data between individuals or groups involved in the localization process. In one embodiment, electronic localization package file 140 is structured according to an extensible schema that defines the format and content of electronic localization package file 140. In one embodiment, the extensible schema provides that electronic localization package file 140 combine localization data files and standard files into a single file.

In the FIG. 1C embodiment, electronic localization package file 140 includes project data 141, file data list 143 and files 145. Also shown in FIG. 1C and not shown in FIG. 1B is default macros 121b and default tasks 121c definition files.

In one embodiment, electronic localization package file 140 contains all the data involved in localizing a project including settings 125b-125c, localization (e.g., 125a in FIG. 1B) and default files 121a-121c and any additional file data (e.g., xml, txt) involved. In one embodiment, electronic localization package file 140 is a single file used to facilitate hand-off and hand-back of project data between product teams (e.g., 101 in FIG. 1A) and multi-language localization vendors (e.g., 103 in FIG. 1A) that the product teams (e.g., 101 in FIG. 1A) are using. In one embodiment, electronic localization package file 140 is self-contained such that it includes macro definition 121b, and task definitions 121c (e.g., sync) data.

In one embodiment, command line applications can directly open and manipulate both electronic localization project file 120 and electronic localization package file 140. In one embodiment, system 200 supports similar functionality for both electronic localization project file 120 and electronic localization package file 140. In one embodiment, electronic localization project file 120 can be unpacked, and the original project and contained files can be extracted. In one embodiment, external tools and utilities can be run against either the electronic localization project file 120 or the electronic localization package file 140.

FIG. 1D shows the structure of the electronic settings configuration file 125b according to one embodiment. In one embodiment, settings configuration file 125b is structured according to an extensible schema that defines its format and content. Configurations settings enable generic, application and language specific settings to be ordered appropriately. For example, a word processing application may be provided to multi-language localization vendors (e.g., 103 in FIG. 1A) for localization for a first country A, and the same word processing application version that includes application and language settings may be provided to multi-language vendors for localization for country B.

In one embodiment, settings configuration file 125b is an ordered list of settings and configurations as referenced external files. In one embodiment, the ordered list of settings and configurations determines the order which the settings value overrides are applied. In one embodiment, settings configuration file 125b can contain a nested settings configuration file 125d. In one embodiment, settings files referenced by nested settings configuration file 125d can be applied in place of those referenced by settings configuration file 125b. In one embodiment, settings configuration files 125b and 125d share common schema (e.g., XML) as electronic localization project file 120.

Operation

Figure 1E:
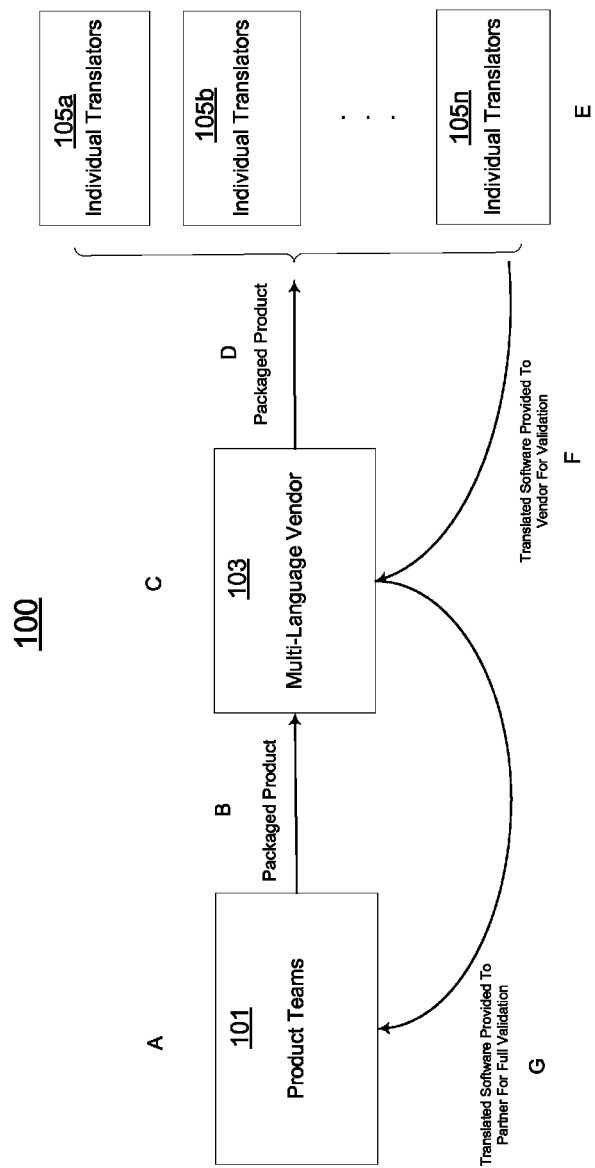
FIG. 1E illustrates operations A-G of a software localization process according to an embodiment.

FIG. 1E illustrates operations A-G performed in a software localization process according to one embodiment. These operations including the order in which they are presented may be merely exemplary. In other embodiments, other operations in other orders can be included.

At A, product teams 101 create a packaged product that includes electronic localization package file 140 (e.g., 140 in FIG. 1C). In one embodiment, electronic localization package file (e.g., 140 in FIG. 1C) combines the data involved in completing a project into a single file that enables the transport of localization data between individuals or groups involved in the localization process.

At B, the electronic localization package file created at A is provided to multi-language vendors.

At C, multi-language vendors identify the proper translator to translate the software that is a part of electronic localization package file. For example, if the target language is French, then a French translator is identified.

At D, the electronic localization package file is provided to the identified individual translator.

At E, the individual translator translates the software provided with the electronic localization package from a source language into a target language. For example, if the target language is French, then the software is adapted to be as familiar as possible to the French consumer, by displaying text in French and using local conventions for the display of such things as units of measurement (e.g., metric system).

At F, the translation of the software (transferred via electronic localization package) is provided to multi-language vendors 103 for validation.

At G, the translation of the software validated by the multi-language vendors at F is provided to product teams 101 for validation.

Embodiments overcome the shortcomings of espresso database (EDB) to meet diversified needs of localization participants. Embodiments of the herein described electronic localization files are essentially container documents that store a series of references to files that are involved in the localization process.

Advantages of embodiments include a common transportation format for localization projects, diffable text files instead of EDB formatted files, published schema (e.g., XML) that can be validated, data transparency based on a complete object model (such as system 200 described with reference to FIG. 2), improved programmatic access to localization data over existing localization systems, improved hand-off and hand-back with translation vendors, ability to distribute localization data within a single project to multiple translators (previously an entire EDB had to be sent to each translator), increased granularity to localization data and settings values for change management, reusable settings definitions that can be applied to any electronic localization file, and unicode support via XML files instead of the code page limitations of EDB.

It should be appreciated that file references stored in electronic localization files discussed herein support the following path types: absolute (absolute path to the file location), relative (relative path to the file location from an electronic localization file), Universal Naming Convention (UNC), macros and environment variables. In one embodiment, macros and environment variables can be a combination of built in and user defined macros for file path plus name values. Moreover, a macro can contain an environment variable value.

System for Creating and Managing Electronic Files for a Localization Project

Figure 2A:
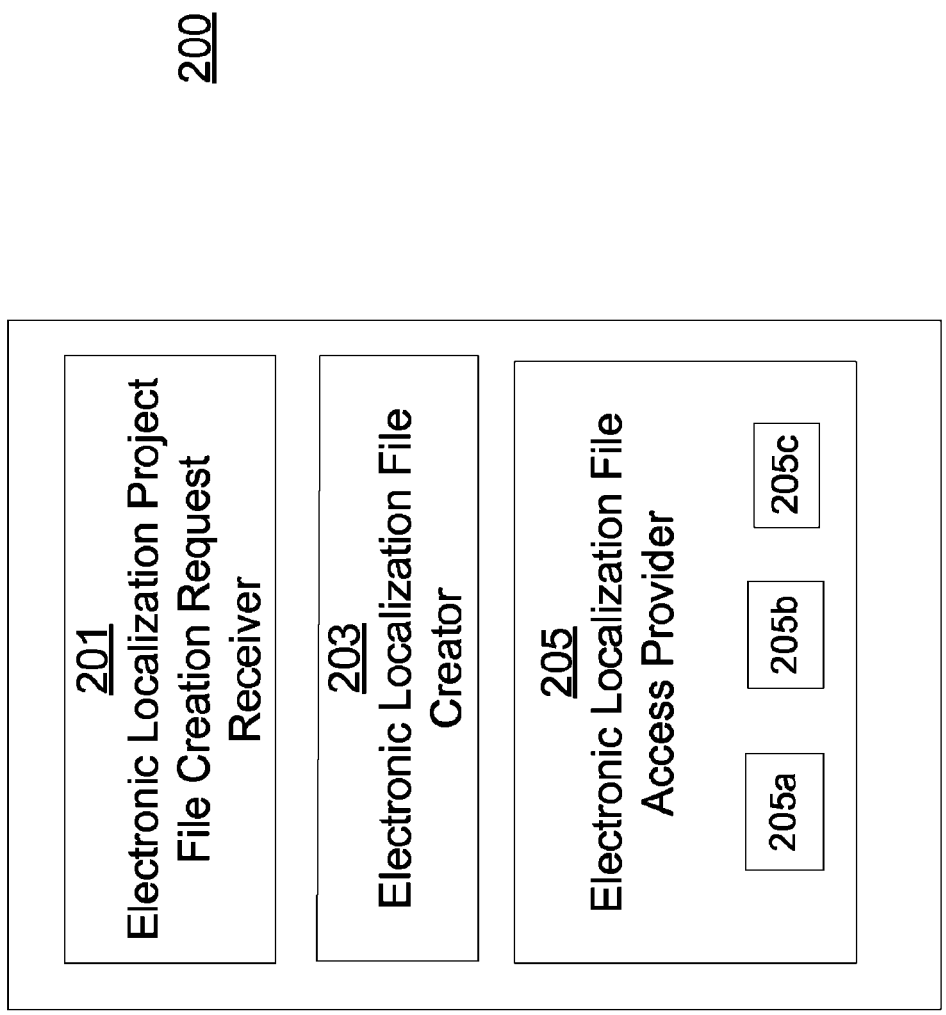
FIG. 2A illustrates components of a system for creating and managing electronic files for a software localization project according to an embodiment.

FIG. 2A shows components of a system 200 for creating and managing electronic files for a software localization project according to one embodiment. In one embodiment, system 200 implements an algorithm for creating and managing electronic files for a software localization project. Moreover, in one embodiment, system 200 provides programmatic access to the electronic localization files. In the FIG. 2A embodiment, system 200 includes electronic localization file creation request receiver 201, electronic localization file creator 203 and electronic localization file access provider 205.

It should be appreciated that aforementioned components of system 200 can be implemented in hardware or software or in a combination of both. In one embodiment, components and operations of system 200 can be encompassed by components and operations of one or more computer programs (e.g., localization system 107 of FIG. 1A). In another embodiment, components and operations of system 200 can be separate from the aforementioned one or more computer programs but can operate cooperatively with components and operations thereof.

Referring to FIG. 2A, electronic localization file creation request receiver 201 receives requests to create an electronic localization file for use in a software localization project. In one embodiment, requests can be submitted by product teams and can include request to create electronic localization project, package and settings configuration files (see FIGS. 1B-1D).

Electronic localization file creator 203 creates electronic localization files for use in software localization projects. In one embodiment, electronic localization file creator 203 can create electronic localization project, package and setting configuration files. In one embodiment, to create a electronic localization project file, electronic localization file creator 203 creates an electronic localization project file that contains a plurality of references to localization files and a plurality of references to standard files.

In one embodiment, to create an electronic localization package file, electronic localization file creator 203 creates a first electronic localization package file that contains a plurality of references to localization and standard files, and, thereafter creates a second electronic localization file that contains the referenced settings file. Electronic localization file creator 203 then combines the referenced localization and standard files involved in the localization effort into a single electronic localization package file that can be readily handed-off and handed-back.

Figure 2B:
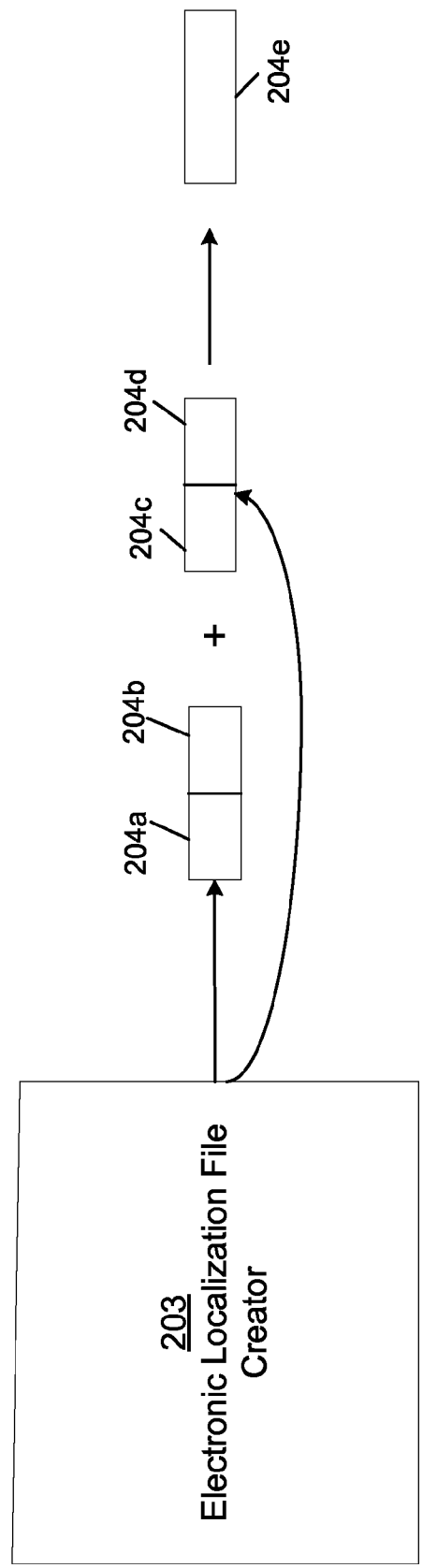
FIG. 2B illustrates the formation of a data structure that contains data that represents an electronic localization file according to an embodiment.

In one embodiment, as shown in FIG. 2B, when electronic localization file creator 203 creates an electronic localization project file, an underlying data structure 204 is created for storage on computer-readable media that includes a first portion 204a that contains data that represents a plurality of references to localization files and a second portion 204b associated with the first portion that contains data that represents a plurality of references to standard files.

Moreover, in one embodiment, when electronic file creator 203 creates an electronic localization package file a data structure portion 204c that contains data that represents localization files involved in a localization project and a data structure portion 204d that contains data that represents standard files are created. As illustrated in FIG. 2B, the files represented by data contained by the aforementioned data structure portions can be combined or packaged to form the electronic localization package file (e.g., 140 in FIG. 1C). As shown in FIG. 2B, data structure portion 204e combines the data of 204a-204d and represents the electronic localization package file.

Referring again to FIG. 2A, electronic localization file access provider 205 provides access to an electronic localization file that has been created as part of a localization project. In one embodiment, access to created electronic localization files can be provided to product teams (e.g., 101 in FIG. 1A), multi-language vendors (e.g., 103 in FIG. 1A) and individual translators (e.g., 105 in FIG. 1A). Access to the files promotes consistent use of localization file formats by producers of products and developers involved in localizing products. In one embodiment, system 200 users can open, read, save and write localization data that is contained in the electronic file formats.

In one embodiment, project access provider 205 includes file manager 205a, properties manager 205b and file converter 205c. In one embodiment, file manager 205a enables the performance of file management functions with regard to electronic localization files such as adding, removing and renaming of file references. Moreover, properties manager 205b enables the entering of project properties such as well-known folders and custom column definitions. Additionally, file converter 205c enables conversion between localization project electronic files and localization package electronic files.

In one embodiment, file manager 205a provides programmatic access to some of the business logic and provides partners more control over resource data. For example, in one embodiment, the programmatic access functionality can include but is not limited to an application building functionality to parse and generate application builds, running extensions and running commands such as update, upload, import and sync.

Figure 3:
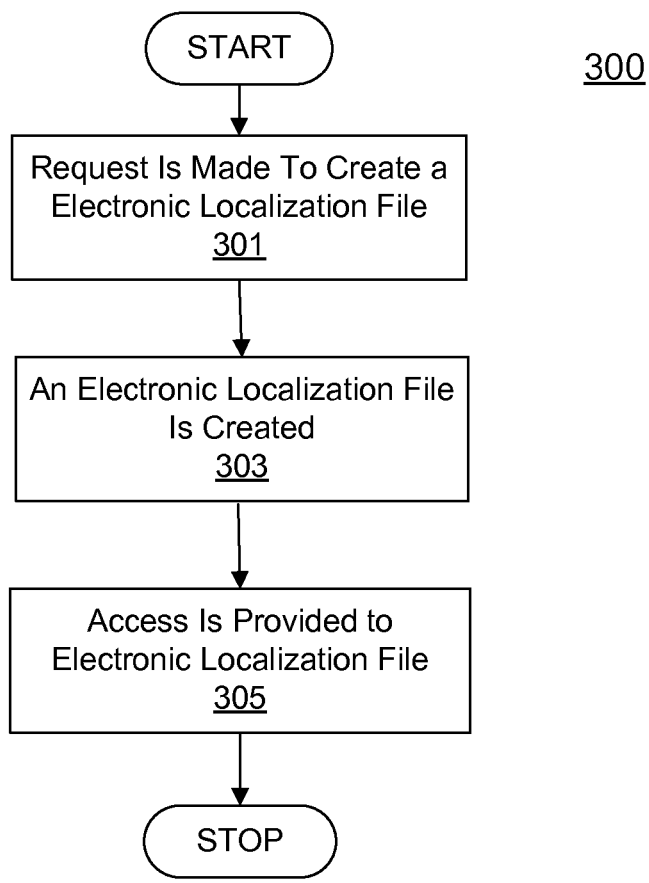
FIG. 3 illustrates a flowchart of the steps performed in a method for creation and management of electronic files for a localization project according to an embodiment.

Exemplary Operations of Method for Creation and Management of Electronic Files for a Localization Project FIG. 3 shows a flowchart 300 of the steps performed in a method for creation and management of electronic files for a localization project according to one embodiment. The flowchart includes processes that, in one embodiment can be carried out by processors and electrical components under the control of computer-readable and computer-executable instructions. Although specific steps are disclosed in the flowcharts, such steps are exemplary. That is the present subject matter may be well suited to performing various other steps or variations of the steps recited in the flowcharts. Within various embodiments, it should be appreciated that the steps of the flowcharts can be performed by software, by hardware or by a combination of both.

Referring to FIG. 3, at step 301, a request is made to create an electronic localization file for use in a localization project. In one embodiment, an electronic localization file creation request receiver (e.g., 201 in FIG. 2A) receives requests to create an electronic localization file for use in a localization project. In one embodiment, requests can be submitted by product teams and can include requests to create electronic localization project, package and settings configuration files (see FIGS. 1B-1D).

At step 303, an electronic localization file is created for use in a localization project. In one embodiment, an electronic localization file creator (e.g., 203 in FIG. 2A) can be used to create electronic localization files for use in a localization project as discussed with reference to FIG. 2A. In one embodiment, the electronic localization file creator (e.g., 203 in FIG. 2A) can create electronic localization project, package and settings configuration files. Details of the electronic localization file creation process are discussed in detail with reference to FIG. 4.

At step 305, access is provided to an electronic localization file that has been created as a part of a localization project. In one embodiment, an electronic localization file access provider (e.g., 205 in FIG. 2A) provides access to an electronic localization file that has been created as part of a localization project. In one embodiment, access to electronic localization files that have been created can be provided to product teams (e.g., 101 in FIG. 1A), multi-language vendors (e.g., 103 in FIG. 1A) and individual translators (e.g., 105 in FIG. 1A).

Figure 4:
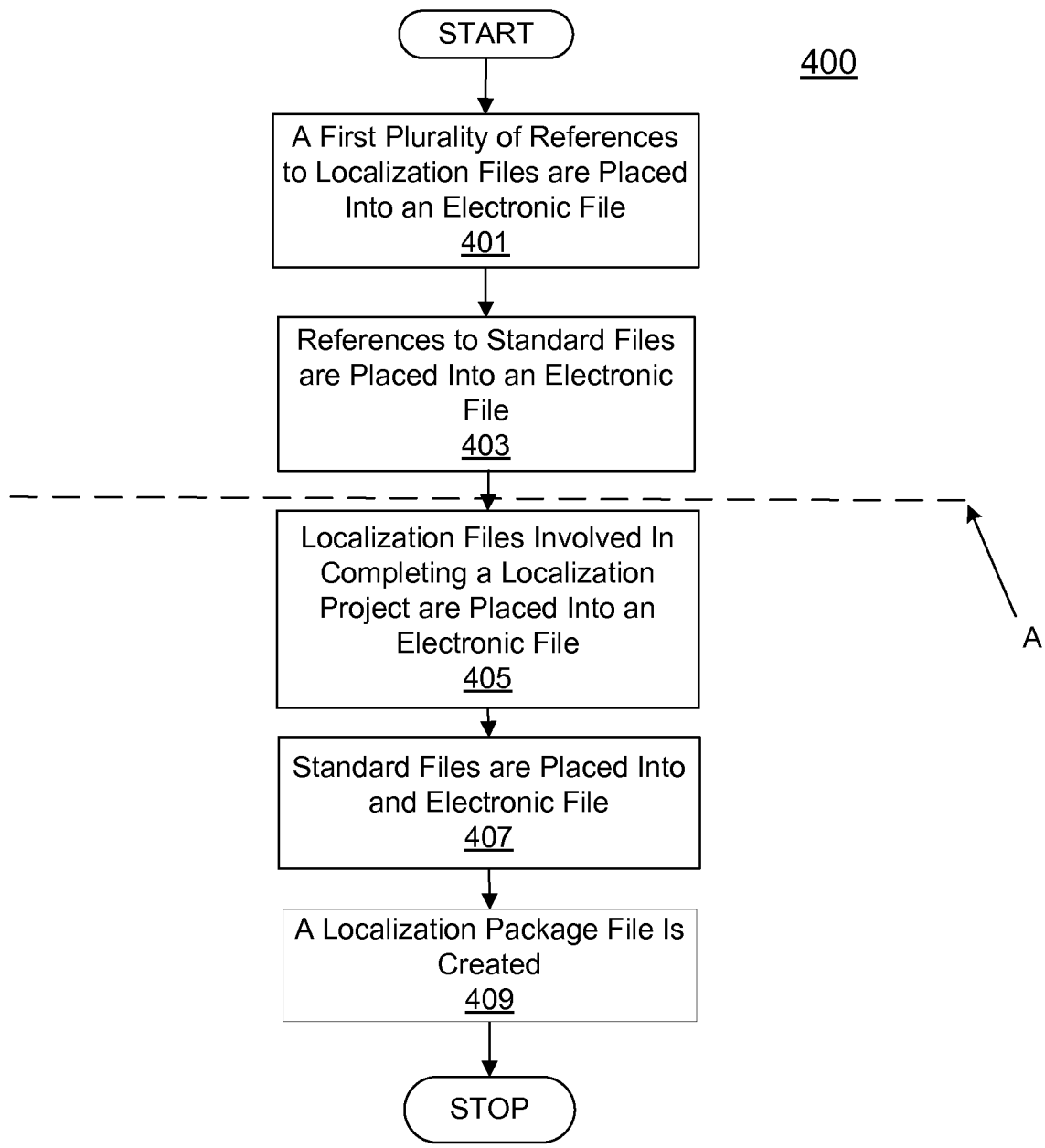
FIG. 4 illustrates a flowchart of the steps performed in a method for creation of electronic localization project files and electronic localization package files for a localization project according to an embodiment.

FIG. 4 shows a flowchart 400 of the steps performed in a method for creation of electronic localization project files and electronic localization package files for a localization project according to one embodiment.

Referring to FIG. 4, at step 401, a plurality of references to localization files is placed into an electronic file. In one embodiment, coincident with the placing of the plurality of references to localization files into the electronic file a data structure portion is generated that contains data representing the plurality of references to localization files.

At step 403, a plurality of references to standard files is placed into the electronic file. In one embodiment, coincident with the placing of the plurality of references to standard files into the electronic file, a data structure portion is generated that contains data representing the plurality of references to standard files. In one embodiment, the data structure portions generated in steps 401 and 403 represent an electronic project localization file that can stand alone. Dashed line A in FIG. 4 indicates the point at which a process for creating a stand alone electronic project localization file would end.

At step 405, localization files that include the data involved in completing a localization project is placed into an electronic file. In one embodiment, coincident with the placing of the data involved in completing a localization project into an electronic file, a data structure portion that is stored on a computer-readable media is generated that contains data representing the data involved in a localization project.

At step 407, a standard file is placed into an electronic file. In one embodiment, coincident with the placing of standard file into the electronic file, a data structure portion that is stored on a computer-readable medium is generated that contains data representing the standard file.

At step 409, the files of steps 401-407 are packaged to form an electronic localization package file.

Exemplary Hardware According to One Embodiment

Figure 5:
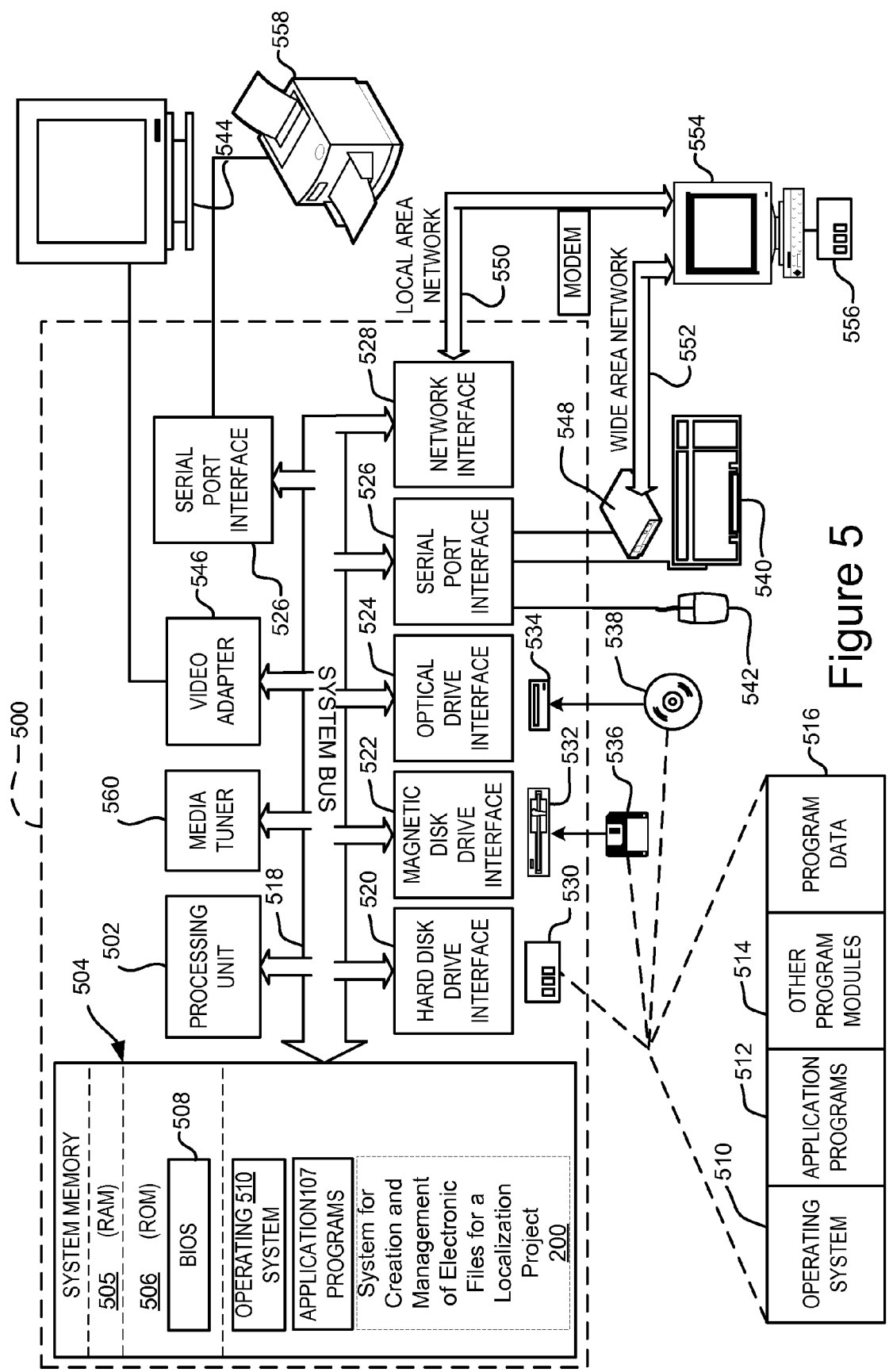
FIG. 5 illustrates an exemplary hardware operating environment according to an embodiment.

FIG. 5 shows an exemplary computer system 500 according to one embodiment. As discussed with reference to FIG. 1A, systems 107 and 200 can run on a computer system such as computer system 500. Moreover, a computing device as disclosed herein can encompass a computer 500 that includes a processing unit 502, a system memory 504 and a system bus 518 that operatively couples various system components including the system memory 504 to the processing unit 502. In one embodiment, there can be one or more processing units (e.g., 502), such that processing unit 502 can comprise a single central processing unit (CPU), or a plurality of processing units (e.g., a parallel processing environment). In one embodiment, computer 500 may be a conventional computer, a distributed computer, or any other type of computer.

The system bus 518 can be any of several types of bus structures including a memory bus or memory controller, a peripheral bus, a switched fabric, point-to-point connections, and a local bus using any of a variety of bus architectures. The system memory 504 can contain data structures such as are described with reference to FIG. 2B. In one embodiment, system memory 504 can include read only memory (ROM) 506 and random access memory (RAM) 505. A basic input/output system (BIOS) 508, containing the basic routines that help to transfer information between elements within the computer 500, such as during start-up, can be stored in ROM 506. The computer 500 can further include a hard disk drive 530 for reading from and writing to a hard disk, not shown, a magnetic disk drive 532 for reading from or writing to a removable magnetic disk 536, and an optical disk drive 534 for reading from or writing to a removable optical disk 538 such as a CD ROM, DVD, or other optical media.

As shown in FIG. 5, the hard disk drive 530, magnetic disk drive 532, and optical disk drive 534 can be connected to the system bus 518 by a hard disk drive interface 520, a magnetic disk drive interface 522, and an optical disk drive interface 524, respectively. In one embodiment, the drives and their associated computer-readable media provide nonvolatile storage of computer-readable instructions, data structures (such as are described with reference to FIG. 2B), program modules and other data for the computer 500. It should be appreciated by those skilled in the art that any type of computer-readable media that can store data that is accessible by a computer, for example, magnetic cassettes, flash memory cards, digital video disks, RAMs, and ROMs, can be used in the exemplary operating environment shown in FIG. 5.

A number of program modules can be stored on hard disk 530, magnetic disk 532, optical disk 534, ROM 506, or RAM 505, including an operating system 510, one or more application programs 107, (e.g., localization system 107 in FIG. 1A) and system for creation and management of electronic files for a localization project 200. Moreover, a user can enter commands and information into the computer 500 through input devices such as a keyboard 540 and a pointing device 542 (e.g., a mouse). Other input devices (not shown) can include but are not limited to a microphone, a joystick, a game pad, a tablet, a touch screen device, a satellite dish, a scanner, a facsimile machine, and a video camera. These and other input devices are often connected to processing unit 502 through a serial port interface 526 that is coupled to system bus 518, but can be connected by other interfaces, such as a parallel port, a game port, or a universal serial bus (USB).

A monitor 544 or other type of display device can also be connected to system bus 518 via an interface, such as a video adapter 546. In addition to monitor 544, computers typically include other peripheral output devices, such as a printer (e.g., 558) and speakers (not shown). These and other output devices can be connected to processing unit 502 through a serial port interface 526 that is coupled to system bus 518, but can be connected by other interfaces, such as parallel port, game port, or universal serial bus (USB). In the case of a media server, a tuner 560 can also be connected with system bus 518 in order to receive and convert analog content signals into digital format and similarly convert digital content into analog signals for transmission to connected devices.

Computer 500 can operate in a networked environment using logical connections to one or more remote computers, such as remote computer 554. These logical connections can be achieved by means of a communication device that can be coupled to or integral with computer 500. It should be appreciated that the claimed subject matter is not limited to a particular type of communications device. Remote computer 554 can be another computer, a server, a router, a network personal computer, a client, a peer device, or other common network node, and can include many or all of the elements described above relative to computer 500, although merely a memory storage device 556 is illustrated in FIG. 5. It should be appreciated that the logical connections depicted in FIG. 5 can include a wired or wireless local-area network (LAN) 550, for example, an Ethernet network, or a WiFi network, and a wide-area network (WAN) 552, for example, a cable network or a telephony network. Such networking environments are commonplace in office networks, enterprise-wide computer networks, intranets and the Internet, which are all types of networks.

In one embodiment, when employed in a LAN 550 environment, computer 500 can be connected to local network 550 through a network interface or adapter 528, which is a type of communications device. Moreover, when employed in a WAN 552 environment, computer 500 can include a modem 548, a network adapter, or any other type of communications device for establishing communications over the wide area network 552. The modem 548, which can be internal or external, can be connected to the system bus 518 via the serial port interface 526. In a networked environment, program modules depicted relative to the personal computer 500, or portions thereof, can be stored in a remote memory storage device. It is appreciated that the network connections shown are exemplary and other means of establishing a communications link between the computers can be used.

In accordance with exemplary embodiments thereof, creation and management of electronic files for a localization project are disclosed. The electronic files are based on a data structure that defines the format and content of the electronic files and includes a first data structure portion that contains data that represents a plurality of references to localization project files. Moreover, the data structure includes a second data structure portion that is associated with the first data structure portion that contains data that represents a plurality of references to standard files.

The foregoing descriptions of specific embodiments have been presented for purposes of illustration and description. They are not intended to be exhaustive or to limit the claimed subject matter to the precise forms disclosed, and obviously many modifications and variations are possible in light of the above teaching. The embodiments were chosen and described in order to best explain the principles of the claimed subject matter and its practical application, to thereby enable others skilled in the art to best utilize the claimed subject matter and various embodiments with various modifications as are suited to the particular use contemplated. It is intended that the scope of the claimed subject matter be defined by the claims appended hereto and their equivalents.

What is claimed is:

1. A method, comprising:
creating a single localization file, that is not a folder, for localizing software, the single localization file structured based upon a schema configured to define a format.

2. The method of claim 1, the single localization file created based upon one or more folders.

3. The method of claim 1, the single localization file created based upon a software localization file.

4. The method of claim 1, the single localization file created based upon a standard file.

5. The method of claim 1, the single localization file created based upon a setting.

6. The method of claim 1, the single localization file configured to package data based upon a target language.

7. The method of claim 1, the single localization file created based upon one or more files and one or more folders.

8. A system, comprising:
one or more processing units; and
memory comprising instructions that when executed by at least some of the one or more processing units, perform a method comprising:
creating a single localization file, that is not a folder, for localizing software, the single localization file structured based upon a schema configured to define a format.

9. The system of claim 8, the single localization file created based upon one or more folders.

10. The system of claim 8, the single localization file created based upon a software localization file.

11. The system of claim 8, the single localization file created based upon a standard file.

12. The system of claim 8, the single localization file created based upon a setting.

13. The system of claim 8, the single localization file configured to package data based upon a target language.

14. The system of claim 8, the single localization file created based upon one or more files and one or more folders.

15. A computer-readable storage medium comprising instructions that when executed perform a method comprising:
creating a single localization file, that is not a folder, for localizing software, the single localization file structured based upon a schema configured to define a format.

16. The computer-readable storage medium of claim 15, the single localization file created based upon one or more files and one or more folders.

17. The computer-readable storage medium of claim 15, the single localization file created based upon a software localization file.

18. The computer-readable storage medium of claim 15, the single localization file created based upon a standard file.

19. The computer-readable storage medium of claim 15, the single localization file created based upon a setting.

20. The computer-readable storage medium of claim 15, the single localization file configured to package data based upon a target language.

* * * * *